June 8, 1926.  1,588,283
H. W. WALLACE
GAUGE FOR RAKER TEETH
Filed Oct. 31, 1923
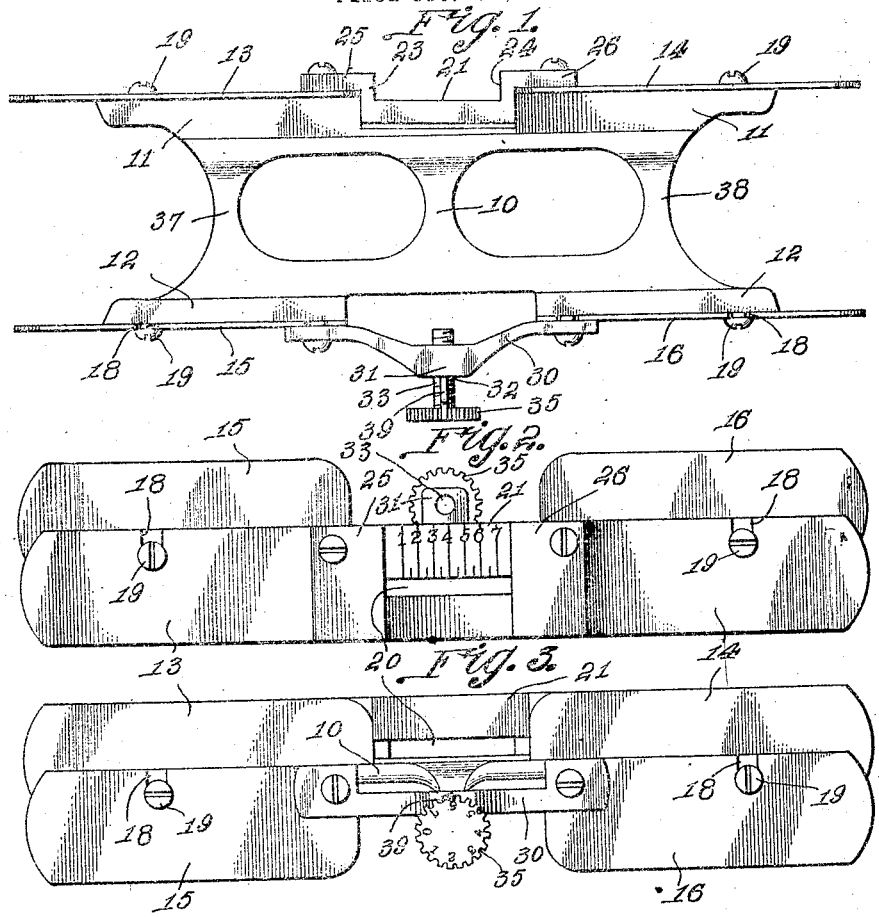
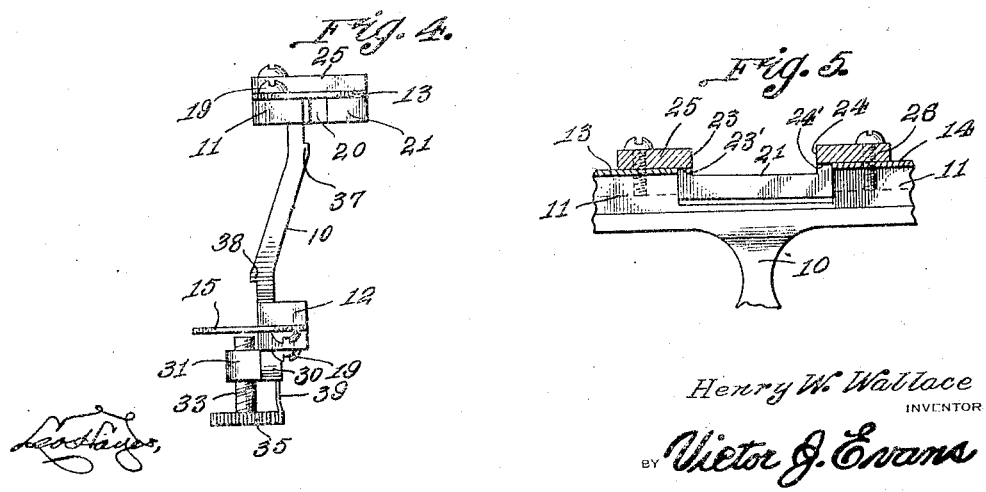
Henry W. Wallace
INVENTOR
BY Victor J. Evans
ATTORNEY Patented June 8, 1926.

1,588,283

UNITED STATES PATENT OFFICE.

HENRY W. WALLACE, OF MONROE, OREGON.

GAUGE FOR RAKER TEETH.

Application filed October 31, 1923. Serial No. 671,989.

The object of this invention is to provide a gauge for the raker teeth of crosscut saws, and especially to improve the construction of the device disclosed in my U. S. Patent No. 1,108,035, issued August 18, 1914.

A further object is to provide an element of special construction and termed a "cut-off slot", and which in reality affords a slot through which the teeth project, this element being of hard steel, in order to resist damage by the file, and being provided with graduations for guidance in connection with the filing operation.

A still further object is to form the slotted element so that the raker teeth may be cut off shorter than the cutting teeth, by a definite fraction of an inch, and to provide for similar accurate adjustment of a screw mounted on the opposite edge portion of the gauge.

With the foregoing and other objects in view, the invention consists in the novel construction and arrangement of elements described, illustrated and claimed, it being understood that modifications may be made within the scope of the claims without departing from the spirit of the invention.

In the drawings, Figure 1 shows the device in elevation; Figure 2 is a top plan view, or view from the upper edge of Figure 1; Figure 3 is a bottom plan view; Figure 4 is an end elevation; Figure 5 is a fragmentary view in vertical section, longitudinally of the slotted portion of Figure 1.

The frame of the gauge is made of aluminum, in order that it may be light, and in order to avoid the unnecessary contact of hard surfaces with the saw teeth. The web portion of the frame is designated 10, being curved as shown, and being of openwork construction.

One edge of the frame is provided with flanges 11, with an intervening space at the central portion of the frame, and a plurality of flanges 12 project from the opposite edge and from the opposite surface of the web portion 10. Considering flanges 11 and 12 as single elements, cut away at the center, the web is provided on its edges with flanges reversely arranged.

Four steel plates 13, 14, 15, 16, are secured to the flanges in the position shown, these plates being polished on their inner sides, adjacent to the saw teeth, and the plates having edge slots 18 permitting attachment to the flanges by means of screws 19. The edges of the plates are flush with the edges of the flanges.

The element providing the cut-off slot 20 includes a central portion 21, positioned between the spaced flanges 11 and between the ends of plates 13, 14. This portion 21 is provided with lines designated 1, 2, 3, 4, 5, 6, 7, and with minor graduations, as shown. The complete element, which is of hard steel, to prevent damage by the file, includes end walls 23, 24, and outwardly extending ears 25, 26. The wall 24 is one thirty-second of an inch higher than wall 23, and element 21 at graduation line 7 is correspondingly lower than at graduation line 1. By cutting the raker tooth off on line 7, it will be one thirty-second of an inch shorter than the cutting tooth. The slot 20 extends through the end walls 23, 24, as shown at 23', 24', and the measurement between the inner surface of plates 13, 14 and the upper surface of element 21 is the important feature.

Between the approaching ends of plates 15, 16 is a bridge piece 30, offset at 31, and having a threaded opening 32 receiving a screw 33 having 32 threads per inch. The head of the screw is provided with notches 35 in the edges thereof, and the surface of the head carries radial lines designated 1, 2, 3, 4, 5, 6, 7, 0,—and rotation through one complete revolution affords a variation of one thirty-second of an inch in the effective length of the screw, this gauge as a whole giving the same adjustments as the element having slot 20. A stationary resilient element 39 cooperates with the notches 35, acting as a holding device, and also serves as a pointer. Guiding ribs 37, 38 extend along opposite sides of the web 10. Upper rib 37 of Figures 1 and 4 is in a plane with one wall of slot 20, and the saw blade rests against this rib when the teeth project through the slot, in position for filing. The saw blade rests against lower rib 38 of Figure 4 when the device is so applied to the blade that the saw teeth are adjacent to plates 15 and 16, and screw 33 is to be made use of for determining the relative length of the teeth. This screw approaches the teeth through the space shown in Figure 1 between the inner ends of plates 15 and 16.

What I claim is:

1. A saw gauge, comprising a frame, plates secured to the frame along one edge, and spaced to provide an opening therebetween, a slotted element extending into the opening, the slot admitting the teeth of a saw when other teeth engage the plates, and said slotted element including a central portion depressed toward one end more than at the other end, the slotted element being rigid with the plates and bridging the ends of the plates and cooperating with said plates for determining the extent of cut in the saw teeth.

2. A gauge to be applied to the blade of a saw, said gauge comprising a frame, alined plates secured to the frame along one edge thereof and spaced to provide an opening therebetween, corresponding surfaces of the plates being in the same plane, a slotted element mounted in the opening, said element being rigid with and bridging the inner ends of the plates, the slot being adapted to receive the blade when the latter contacts with and extends alongside one surface of the frame, and said element having a graduated surface inclined with reference to the plates.

3. A saw gauge, comprising a supporting element, alined plates extending along one edge thereof and projecting laterally therefrom, the plates being spaced from each other, a member bridging the plates and including a portion offset from the plane of the plates and having a threaded bore, a screw entering the bore, the head of the screw being graduated and notched, and a stationary resilient element cooperating with the notched end of the graduated portion, the end of the screw being adjacent to the ends of the teeth of a saw when the device is applied to the saw blade so that the teeth engage the plates.

In testimony whereof I affix my signature.

HENRY W. WALLACE.